United States Patent
Dixon

[15] 3,659,382
[45] May 2, 1972

[54] SEALS
[72] Inventor: Bernard Dixon, Harpenden, England
[73] Assignee: Sealmaster Limited, London, England
[22] Filed: Mar. 17, 1971
[21] Appl. No.: 125,347

[30] Foreign Application Priority Data

June 16, 1967 Great Britain...............27,950/67

[52] U.S. Cl................................................49/481, 49/483
[51] Int. Cl...........................................................E06b 7/16
[58] Field of Search............................49/475, 480–483, 49/484, 489, 493, 468, 470, 370, 366; 277/58, 50, 177, 173

[56] References Cited

UNITED STATES PATENTS

| | | | |
|---|---|---|---|
| 416,357 | 12/1889 | Coleman | 49/481 |
| 1,948,017 | 2/1934 | Wuebling | 49/483 X |
| 2,494,247 | 1/1950 | Kinish | 49/481 |
| 3,296,356 | 1/1967 | McAdams | 49/483 X |
| 3,453,780 | 7/1969 | Thompson | 49/489 X |

FOREIGN PATENTS OR APPLICATIONS

| | | | |
|---|---|---|---|
| 519,765 | 5/1953 | Belgium | 49/481 |
| 567,501 | 12/1923 | France | 49/481 |
| 633,872 | 2/1962 | Italy | 49/480 |

Primary Examiner—David J. Williamowsky
Assistant Examiner—Philip C. Kannan
Attorney—Stevens, Davis, Miller & Mosher

[57] ABSTRACT

A door seal having a channel-shaped rigid member in which is contained a sealing member. A resilient member is located between the sealing member and the channel member and a longitudinal ridge, which forms part of either the sealing member of the channel member, is arranged so as to deform the resilient member when the sealing member is depressed in use.

6 Claims, 4 Drawing Figures

INVENTOR
BERNARD DIXON
By Stevens, Davis, Miller & Mosher
ATTORNEYS

INVENTOR
BERNARD DIXON
By Stevens, Davis, Miller & Mosher
ATTORNEYS

SEALS

This application is a continuation of application Ser. No. 736,461 filed June 12, 1968, now abandoned.

This invention relates to seals and more particularly to seals of the type used in building construction for sealing doors, window, etc.

The present invention seeks to provide a seal of this type which is sufficiently supple to avoid the sealing element being under excessive pressure.

According to the invention a seal comprises a channel shaped rigid base member whose aperture is of less width than the largest width of the channel, a sealing member having a first portion adapted to protrude from the channel aperture to effect a seal and a second portion by which it is retained in the channel member and a resilient member between the sealing member and the base of the channel to impart resilience to the sealing member, the sealing member or the base of the channel having a longitudinal ridge engaging the resilient member in such a way that when the sealing member is depressed in use, the ridge will deform the resilient member.

Preferably the sealing member is rigid and has a rounded sealing extremity. The resilient member may be a tube which imparts resilience to the sealing member when deformed from its normal section.

The invention will now be described in greater detail by way of example with reference to the accompanying drawings, in which.

Figure 1:
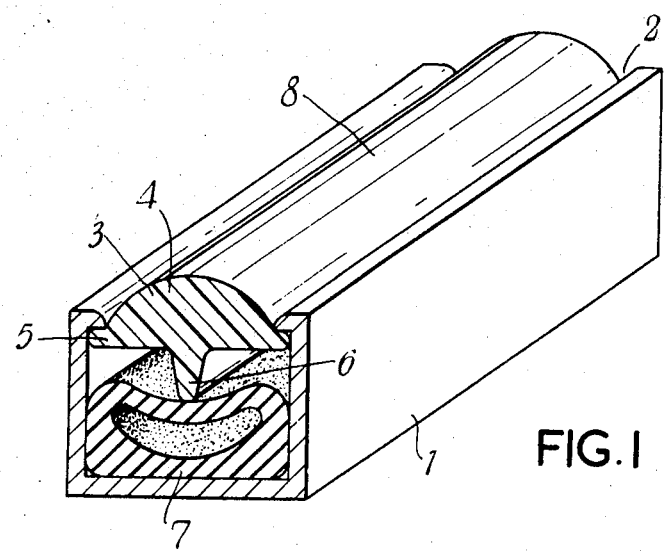
FIG. 1 is a perspective view of a seal in accordance with the invention.

Referring first to FIG. 1, a seal comprises a rigid metallic channel member 1 having its aperture 2 therein of less width than the maximum width of the channel. A sealing member 3 is provided and includes a first portion 4 which protrudes from the channel member 1 to provide the seal and a second portion 5 which retains the sealing member 3 within the channel. The sealing member 3, which is made from a rigid plastics material, is also provided with a longitudinal ridge 6 extending towards the base of the channel member 1 and engages a resilient piece or member 7. The sealing surface 8 of the sealing member 3 is rounded to assist correct sealing.

The resilient piece or member 7, which imparts resilience to the sealing member 3, is a tube of resilient plastic or rubber and is in its unstressed form generally oval. In its normal condition this oval is somewhat deformed by the ridge 6 which, when the sealing member 3 is depressed during sealing, will further deform the oval to provide a resilient effect.

Figure 2:
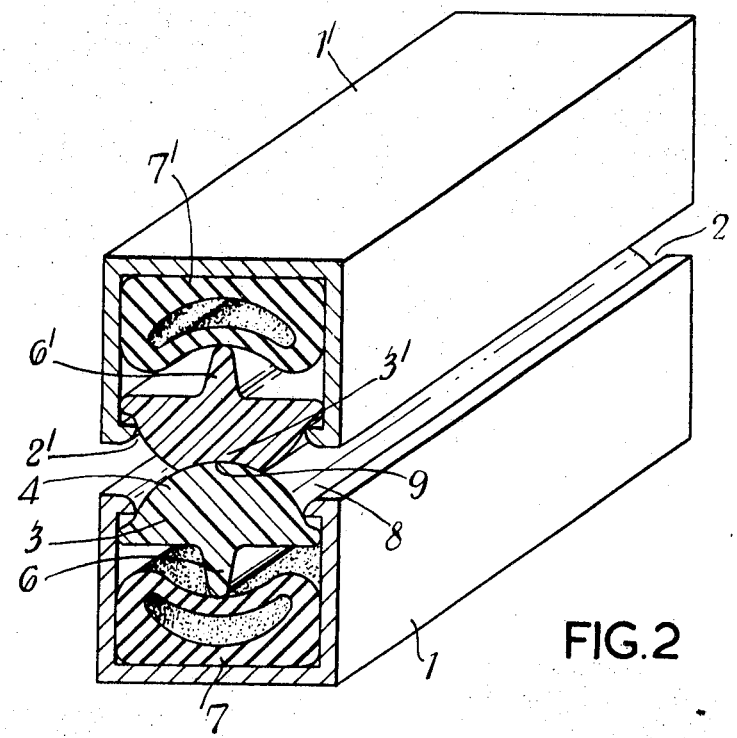
FIG. 2 is a perspective view of the seal of FIG. 1 cooperating with a complementary seal also in accordance with the invention.

FIG. 2 shows the cooperation of the seal of FIG. 1 with a complementary seal which is almost identical. Like parts in the complementary seal are marked "'". From this Figure it will be seen that the only difference between the two seals is the provision of a longitudinal groove 9 in the sealing member 3' into which the rounded part 8 of the sealing member 3 fits. This type of sealing arrangement is often used where two moving structures are to be sealed together such as double doors.

Figure 3:
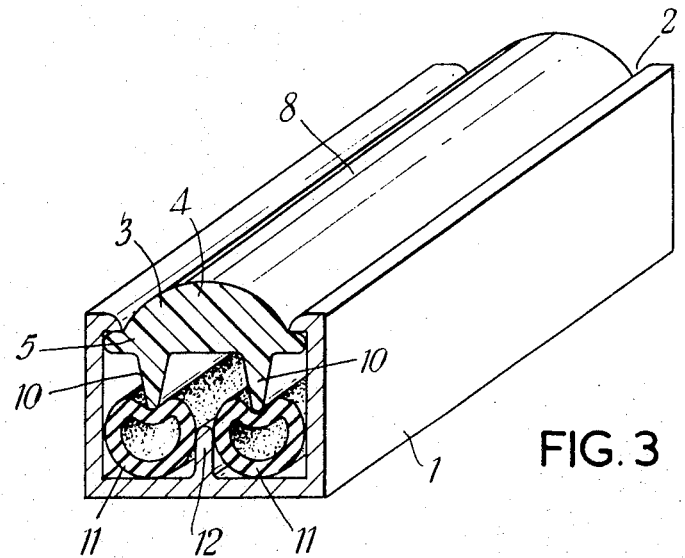
FIGS. 3 and 4 show alternative constructions of seal.

FIG. 3 shows a seal in which a double support is used for the sealing member 3. In this embodiment the single ridge 6 is replaced by a double ridge 10. Each of the ridges 10 engages a generally circular tubular resilient member 11 and in order to separate these two resilient members and retain them in their correct positions, the channel member 1 is divided towards its base by a divider 12.

Figure 4:
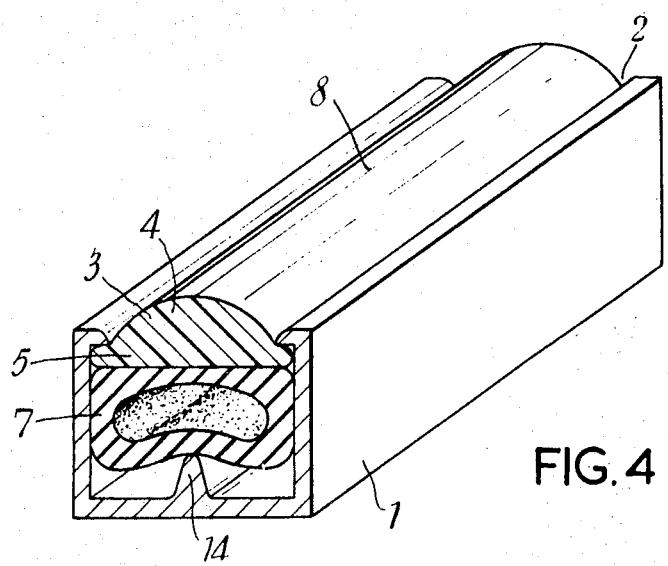

In the embodiment of FIG. 4, the ridge 6 on the sealing member 3 is replaced by a ridge 14 on the base of the channel member 1, the major part of one side of the resilient member 7 bearing directly on to the sealing member 3.

It will be appreciated that various modifications can be made to the above described embodiments without departing from the invention. For example, the sealing member 3 may also be of a resilient plastics material (although preferably less resilient than the resilient members 7 and 11) or it may have a resilient sealing insert. The resilient members 7 and 11 instead of being tubular may be of resilient foam or other suitable material.

What is claimed is:

1. A seal of elongate form comprising a channel shaped rigid base member whose aperture is of less width than the largest width of the channel, a sealing member having a first portion adapted to protrude from said channel aperture to effect a seal and a second portion by which it is retained in said channel member, and a piece of resilient material between said sealing member and the base of said channel to impart resilience to said sealing member, one of said members having a longitudinal ridge of transverse dimension at its outer extremity substantially less than the largest width of the channel, the ridge extremity engaging said resilient piece in such a way that when said sealing member is depressed in use further into the channel, the ridge extremity is adapted to form a depression elongated longitudinally of the ridged member and concave transversely of the latter member.

2. A seal according to claim 1, in which the sealing member is rigid and is formed with the longitudinal ridge, the transverse dimension of the ridge being progressively reduced from the base of the ridge to the outer extremity of the ridge.

3. A seal according to claim 1, in which the channel member is formed internally with the longitudinal ridge, the ridge upstanding from the channel base.

4. A seal according to claim 1, in which said sealing member is rigid and has a rounded sealing extremity.

5. A seal according to claim 1, in which said resilient piece is in the form of an open-ended tube.

6. A seal according to claim 1, in which there are two such resilient pieces and respective ridges, the said pieces being disposed side by side between the side walls of the channel, and one such piece being disposed in like relationship to the sealing member and the base of the channel as the other such piece.

* * * * *